United States Patent [19]

Bodem et al.

[11] 4,050,127
[45] Sept. 27, 1977

[54] CLAMPING TOOL HOLDER

[75] Inventors: Johann Bodem, Reutte, Austria; Thomas Raine, Stockport, England

[73] Assignee: Schwarzkopf Development Corporation, New York, N.Y.

[21] Appl. No.: 743,503

[22] Filed: Nov. 19, 1976

[30] Foreign Application Priority Data

Nov. 21, 1975 Austria .................................. 8865/75
Feb. 6, 1976 Austria .................................. 850/76

[51] Int. Cl.² .............................................. B26D 1/00
[52] U.S. Cl. ..................................... 407/107; 407/113
[58] Field of Search ............................................ 29/96

[56] References Cited

U.S. PATENT DOCUMENTS 3,192,603  7/1965  Greenleaf ................................. 29/96
3,837,058  9/1974  Barkley et al. ........................... 29/96

Primary Examiner—Leonidas Vlachos
Attorney, Agent, or Firm—Morgan, Finnegan, Pine, Foley & Lee

[57] ABSTRACT

A disposable insert is positioned on a pin in a stepped recess of a cutting tool shank. A slidable wedge positioning block and clamp member are carried on a screw at the rear portion of the stepped recess. Tightening the screw causes the clamp to clamp the top of the insert and the positioning block to wedge the insert forwardly against the pin to securely hold the insert.

7 Claims, 7 Drawing Figures

CLAMPING TOOL HOLDER

BACKGROUND OF THE INVENTION

The invention relates to a toolholder for pin-type cutting inserts for machining, particularly copy turning and numerically controlled machining operations in a double-axed coordinate system.

Clamped cutting inserts have largely superseded brazed tools. Reasons for this development are the high expense involved in regrinding of the cutting edges, the difficulty of adhering to machining tolerance with tools which are not precisely reground and, above all, the increasing use of non-regrindable hard-coated inserts.

Two basic types of tool holders are used for clamped tools. In one case, the insert is embedded in a corresponding recess of the tool shank and is clamped from above by means of a clamp which rests on part of the upper surface of the insert. In the other basic design, a pin extends from the underside of the shank into the central bore of the pin-type tool and clamps the insert against the shank. According to one design, the insert is clamped through the bore by means of a screw against the tool shank.

In a clamped tool in accordance with the first basic design, the deeply embedded cutting insert can be exactly positioned in the tool shank and the compressive forces acting on the insert during turning can be normally positively transferred to the shank because the forces to be transmitted deviate only slightly from the ideal direction.

A cutting tool of this basic type, however, has a voluminously cantilevered tool shank and thus limits the directions from which the tool can be positioned in relation to the workpiece so greatly that various machining operations cannot be carried out. In addition to this serious disadvantage, there is always a danger in clamped tools that the chip cannot run off freely.

In contrast to this, a disposable insert with pin-type clamp is easily accessible and normally easily replaceable. Its exposed position on the end of the shank permits the unimpeded feeding of the insert which is particularly important in copy turning. On the other hand, the exact positioning of the insert presents problems. Furthermore, an adequate positive force transfer between insert with chip grooves and the shank is achieved only if, instead of the economic disposable insert with its small support surface, indexable inserts with cutting edges on one side only are used. Nevertheless, a satisfactory force transfer between workpiece and tool shank is frequently not obtained when forces from varying directions impinge on the cutting edge, as, for example, in turning in two coordination directions with alternating use of two cutting edges adjoining the nose of the tool.

The problem of climbing, i.e., lifting off the insert from the shank, and, consequently, chatter and vibration, is the reason why in a toolholder of the second type practically only prismatic and not positive rake inserts are used, although the latter have the advantage of allowing a greater variation of the angle between the insert and the workpiece. Even when prismatic inserts are used, the supporting surface on the shank must be inclined towards the working point of the tool in order to prevent climbing. However, due to the clearance angle required in turning, this measure shortens the usable length of the cutting edge and thus limits the possibility of turning with two cutting edges alternately, without indexing of the tool. The importance of this problem can be gauged from the fact that several makers of cutting inserts have deemed it necessary to develop expensive and not always satisfactory inserts with curved cutting edges.

Attempts have been made to combine the advantage of these two systems. For example, a triangular insert is placed on a shank with fixed pin and arrested by clamping a wedge at the side of the insert opposite the working point between the flank of the insert and the vertical shank surface. This type of clamping tool holder entails the risk of cutting edge damage through the wedge and also lacks the advantage of clamping of the insert from above. This applies even to the tools in which the wedge has a nose which rests on top of the insert because adequate froce transfer from above and from the side simultaneously through a single movable clamping component is very problematical.

In another toolholder design, the support of a pin tip by means of a pin and a clamp is achieved by a movable locking pin connected at right angles with a sliding bar which in turn moves in a nut in the shank below the supporting surface for the insert, ending below the threaded hole for the screw of the positioning clamp. By suitable facetting of the sliding bar blank and screw point, the screwing down of the clamp gives rise to a wedge action on the pin so that a thrust is exerted on the pin away from the tool point towards the wall of the bore in the insert. This toolholder design fulfills a number of tool requirements for turning, particularly copy turning. However, the exact positioning of the insert is not guaranteed. Furthermore, this design tends to undesirable wedging of the sliding bar in the shaft groove. This clamped tool holder was not very successful, however, mostly because the production is too expensive.

The design requirements for a clamping tool holder for copy turning are severe because, on the one hand, the inserts must be freely accessible to the workpiece, while on the other hand, the insert must be secured against slippage on the tool shank and precisely positioned.

Under these conditions, the use of several movable clamping elements makes possible an efficient transmission of the forces exerted on the insert from different directions of the workpiece. In practice, however, the fixation of the cutting inserts by the different clamping elements varies considerably in its effectiveness. In addition to design deficiencies, the insufficient ability of the clamping elements to slide relative to each other is a frequent source of malfunction.

Hence, it was the object of the present invention to reduce or resolve the above-described problems, particularly in connection with copy turning and machining in a double-axial coordinate system, through the new clamping tool design.

An additional object is to achieve a further increase in reliability of operation by a particularly advantageous design of the object of the invention.

SUMMARY OF THE PRESENT INVENTION

The new design of clamping tool holder should also be suitable for use with the commercially available disposable inserts so that the simultaneous use of a top clamp and a bore with pin seemed indicated. The invention consists in the fact that the movable elements of the clamping device comprise a clamp with screw and a positioning block with slotted hole and screw, that the recesses in the tool shank for the accommodation of cutting insert and clamp contains two horizontal steps, with the insert being supported on the frontal step and the positioning block on the rear step, away from the tool point, that the clamp is equipped at the side, opposite to the insert with a wedge extension which points towards the positioning block and tapers downwards, and that the wedge extension causes the positioning block which is individually adapted to the type of insert used, to be clamped against one or more flanks of the disposable insert, at the same time ensuring a precise positioning of the disposable insert. Alternatively, a cradle-type convexity in the clamping shoe is slidably supported in a corresponding recess in the positioning block and the wedge action required for pressing the positioning block against the insert is provided by sloping rear walls of the positioning block and tool shank recess.

DETAILED DESCRIPTION

Figure 1:
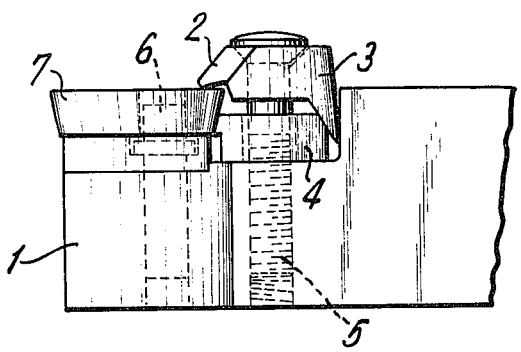
FIG. 1 shows a preferred tool holder design in accordance with the invention, for a triangular cutting insert (side view).

FIG. 1 shows first the steplike recess in the tool shaft 1. The front step serves as supporting face for the disposable insert 7, into the central bore of which extends the pin 6, which is fixed in the shank. On the rear step, away from the cutting point of the insert, rests the positioning block 4 with slotted hole. The clamp 2 rests on the surface of the insert and is connected with the shaft via the screw 5. The wedge extension 3 of the clamp lodges between positioning block and shank rear wall and, when lowered, pushes the positioning block against the lateral flank of the insert and pushes at the same time the central bore wall exactly in the direction of the working point against the fixed pin 6.

FIG. 1 shows clearly that the wedge extension 3 does not abut with its entire outer surface against the vertical shank wall but forms with it an angle which is open towards the top from 1° to 10°. Hence, the contact takes place only along a line. It has also been found to be advantageous to give the outer surface of the wedge extension a slight convex curvature so that it forms a cylindrical surface with the cylinder axis being horizontal. Owing to the two-piece clamping device, consisting of clamp and positioning block, the clamping forces the top and sides, both increase approximately linear with tightening of the screw. Because of the fixed pin the insert is precisely positioned in a forward direction towards the working point. An uncontrolled lateral turning of the insert is thus prevented because the insert is connected almost along its entire lateral surface via a line of contact with the positioning block and is consequently held exactly in a predetermined direction.

Figure 2:
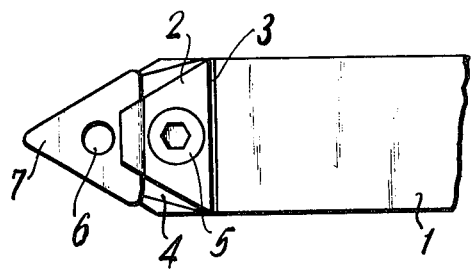
FIG. 2 is a top view of the tool holder.

FIG. 2 shows the same toolholder design from a different angle and serves to illustrate the explanation of FIG. 1.

Figure 3:
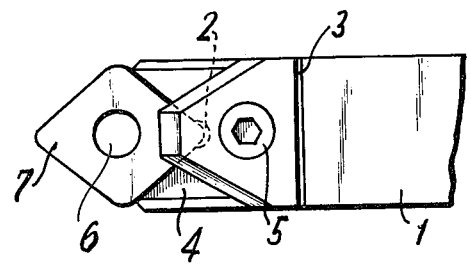
FIG. 3 is a top view of an embodiment for diamond-shaped inserts.

FIG. 3 shows the clamping tool in accordance with the invention, specially adapted for diamond-shaped inserts. In this design, the transition from front to rear step on the shank has the same V-shape as, seen from the top, the flank of the positioning block which contacts the positioning block.

Figure 4:
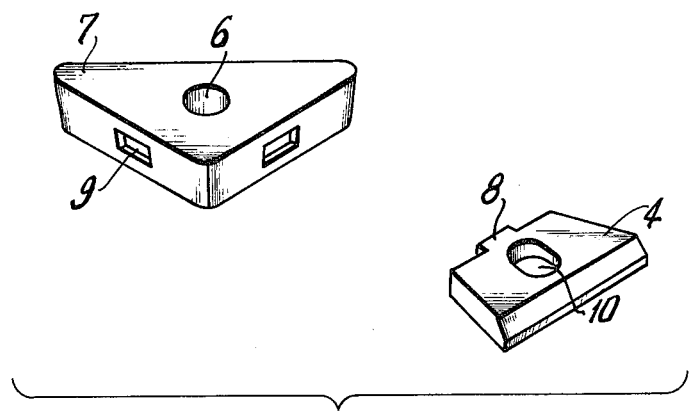
FIG. 4 shows the design of additional elements for the positioning of the insert in the form of tongue and groove for a prismatic disposable insert.

FIG. 4 shows in an exaggerated manner how the precision positioning of insert and positioning block can be further increased by means of additional positioning elements. FIG. 4 shows a design in the form on tongue 8 and groove 9 for a prismatic insert. Positioning in the form of bore and pin with conical point is also feasible.

Figure 5:
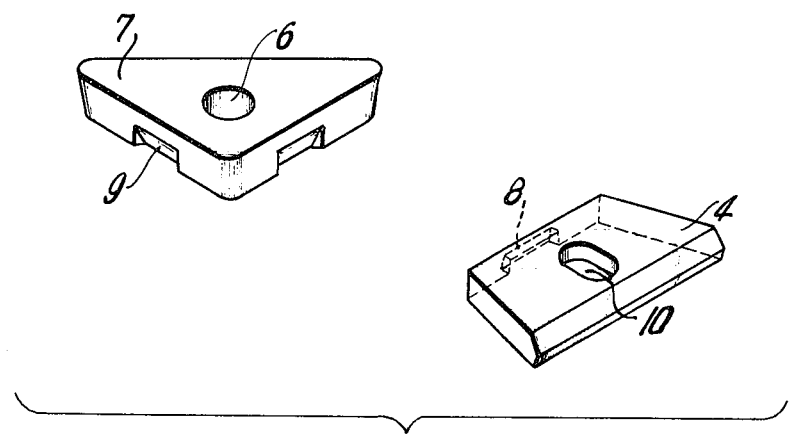
FIG. 5 shows the positioning elements in the form of tongue and groove for a positive rake disposable insert.

It can be inferred from FIG. 5 that the positioning elements in the form of tongue and groove with a positive insert with cutting edges on one side only are particularly easy to realize from the viewpoint of production.

The clamping tool in accordance with the invention can be individually designed to accommodate all the commercial pintips. Because of its horizontal supporting surface, the toolholder is particularly suitable for the use of positive-rake disposable inserts.

The clamping tool described herein combines almost ideally the positive characteristics of the above-described toolholder types. The insert is freely accessible in the shaft but still precisely positionable. The chip flow is unimpeded. With the clamping toolholder design in accordance with the invention, the undesirable climbing and vibration to the inserts does not arise because the pin clamping is combined with a fully effective jaw clamp. There is little risk of damage to the hidden cutting edges of the insert. The design of the clamping holder is simple and fairly trouble-free and can thus be produced at comparatively low cost.

Above all, the clamping toolholder in accordance with the invention offers substantial advantages for copy turning of machining in a double-axed coordinate system. Previously, copy turning was usually carried out with multiple cutters, where each cutting tool could only carry out a limited machining operation, so that several tools had to be used simultaneously or in sequence. The setting of the machine tool, i.e. the adjustment of each individual cutting was very time-consuming and expensive, particularly when tilted and laterally inclined tool shank supports had to be used. The clamping holder in accordance with the invention simplifies the adjustment of the disposable inserts decisively because a positive insert can be set on a horizontal support. The number of tools required for a machining operation can be greatly reduced on account of the freely accessible cutting edges.

The advantages of this clamping tool are particularly apparent in machining with numerical control because machining in a double-axed coordinate system is possible. The two cutting edges of a positive rake disposable insert, likewise with chip grooves, adjoining the working point, can be alternately used without resetting of the tool and the clamping tool holder still guarantees satisfactory transfer of the compressive forces from the workpiece to the tool shank. In numerically controlled machining, the entire machining operation is usually possible with a single tool which is easily adjustable. Thus, an economic tool is available for numerically controlled machining particularly for medium-large production runs.

Figure 6:
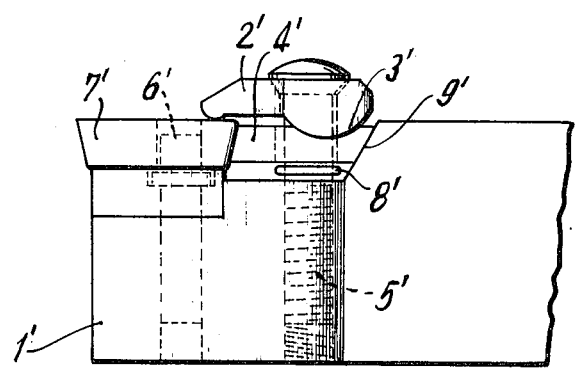
FIG. 6 shows the preferred design in sectional view.

FIG. 6 shows an alternative embodiment similar to FIG. 1. This embodiment includes, first, the steplike recess in the tool shank 1'. The disposable insert central hole 7' into which extends the pin 6' anchored in the shank. On the rear step, starting from below, there is an elastic plastic ring 8' (optional); on top of this ring, the positioning block 4' and then the clamping shoe 2'. All three elements are held in the shank by means of the screw 5'. The cradle-type convexity (axis perpendicular to plane of paper) on the clamping shoe 3', shown in the figure as a circular segment, is slidably supported in a corresponding recess in the positioning block so that when the clamping shoe and positioning block are lowered by turning the screw, mutual sliding of these two elements is possible.

The sloping rear walls 9' of the positioning block and the tool shank recess serve as wedge elements for pressing the positioning block against the lateral flank of the cutting insert. In order to enable satisfactory sliding of the walls on each other, contact between the sloping walls should be limited to a line of contact. The slope relative to the vertical is about 30°.

Figure 7:
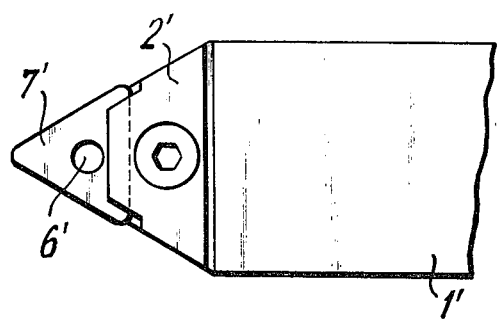
FIG. 7 shows the same clamping tool holder in top view.

The top view of FIG. 7 indicates the shape of clamping shoe and positioning block for clamping of triangular pin-type inserts.

As with the embodiments of FIGS. 1-5, this clamping holder design is not limited to use with triangular inserts. The design can be adapted to all pin-type tools. Additional positioning means such as tongue and groove on the positioning block and cutting insert are also provided in the design of the additional application.

We claim:

1. A clamping tool holder comprising a tool shank equipped on its front end with a stepped recess, into the horizontal frontal lower face of which there is set a pin, on which a disposable pin-type cutting insert is placed, and from the rear upper face of which a screw thread extends into the shaft, in which a clamping screw is inserted which passes through a clamp; wherein a positioning block is located below the clamp which is slidably arranged in relation to said clamp, and which is fitted with an oblong hole, through which said clamping screw extends, and elements having a wedging action on the clamp and positioning block and rear wall of the shank recess, by means of which a clamping of the positioning block against one or more lateral faces of the disposable cutting insert is effected.

2. A clamping holder in accordance with claim 1, wherein said clamp is a clamping shoe having at its rear end opposite to the insert a downwards extending wedge-like extension, one wedge face of which rests against the lateral face of the positioning block opposite the insert and one wedge face of which abuts on the rear wall of the shank recess.

3. A clamping holder in accordance with claim 2, wherein there is a rear wall perpendicular to the lower face of the shank which forms an angle of 1°-10° open to the top, with the rear wedge face of the extension so that contact is restricted to a line.

4. A clamping holder in accordance with claim 2, providing for the exact positioning of the disposable cutting insert, a projection on the positioning block which engages a corresponding recess in the side flank of the insert according to the principle of tongue and groove.

5. A clamping holder in accordance with claim 2, incorporating a conically tapering pin on the positioning block, which engages a corresponding hole in the side flank of the cutting insert.

6. A clamping holder in accordance with claim 1, incorporating a cradle-type convexity at the clamping shoe, which is slidably supported in a corresponding recess in the positioning block and also by wedge elements in the form of sloping rear walls on positioning block and shank recess.

7. A clamping tool holder comprising:
a tool shank having a stepped recess at one end;
a pin extending upwardly from the lower face of said recess;
a disposable pin-type cutting insert having a central hole therein and positioned on said pin;
a threaded hole extending into said shank in the upper face of said recess;
a clamping screw threadably engaged in said hole and slidably locating a positioning block adapted to engage the side of said insert;
a clamp carried on said screw above said positioning block and extending over the top of said insert;
said clamp, positioning block and rear wall of said recess cooperating to wedge said insert against said pin and clamp said insert as said screw is tightened.

* * * * *